May 29, 1962 W. I. E. KAMM ET AL 3,036,588
TIRE PRESSURE CONTROL DEVICE
Original Filed Sept. 10, 1958
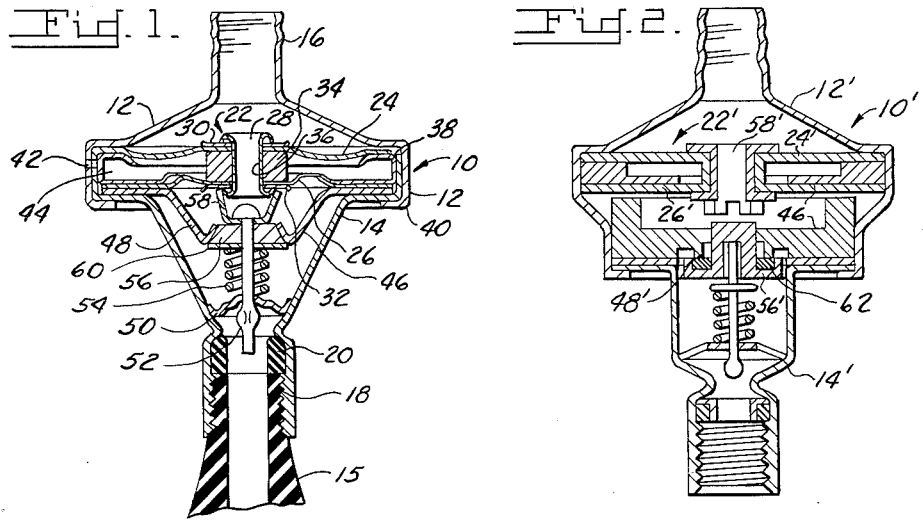
INVENTORS,
Wunibald I. E. Kamm
BY Willy Krautter
Kurt Staiger
S.J. Rotondi, A.J. Dupont & R. M. Lyon

3,036,588
TIRE PRESSURE CONTROL DEVICE
Wunibald I. E. Kamm, Stuttgart, Germany, Kurt Staiger, Indianapolis, Ind., and Willy F. Krautter, Portland, Pa., assignors to the United States of America as represented by the Secretary of the Army
Original application Sept. 10, 1958, Ser. No. 760,277, now Patent No. 2,944,579, dated July 12, 1960. Divided and this application Nov. 3, 1959, Ser. No. 856,885
5 Claims. (Cl. 137—225)
(Granted under Title 35, U.S. Code (1952), sec. 266)

The invention described herein may be manufactured and used by or for the Government for governmental purposes without the payment of any royalty thereon.

The invention relates to improvements in pneumatic tire valves for use with tire pressure controls of the centrally regulated type whereby the tires of a vehicle may be inflated or deflated during operation of the vehicle. More particularly this invention relates to a valve having an improved check valve assembly with a differential pressure responsive element therein for opening a check valve to permit inflation or deflation of a pneumatic tire.

This application is a division of our original application Serial No. 760,277 filed September 10, 1958, now issued as U.S. Patent No. 2,944,579 dated July 12, 1960, for Tire Pressure Control Device.

It is well known that the traction of vehicles on soft terrain may be greatly improved by decreasing the pressure within the tires thereby increasing the tire supporting surface, and also that a decreased tire pressure will provide greater riding comfort on rough roads. Conversely, high tire pressures decrease rolling resistance and tire carcass temperatures on smooth roads thereby increasing economy and safety. Therefore, means have been proposed for changing the tire pressure in accordance with the type of surface upon which the vehicle is travelling, and many of these means are of the type which permit the tire pressure to be regulated while the vehicle is in motion.

One of these arrangements provides for connecting the tire tube directly to a controllable compressed air source within the vehicle by means of conduits and sealing structure between the axles and hubs. The primary disadvantage of this system lies in the fact that holding the tire pressure depends on the efficiency of the sealing structure, and, as the seals are subject to wear, it is very difficult to maintain an effective seal at all times. Also, there is the danger of the tires collapsing if the sealing system or compressed air source should completely fail.

Another tire pressure control arrangement provides for a system of double conduits and double sealing boxes on each wheel connected to a special tire valve whereby compressed air within one conduit opens or closes the valve while the air flowing through the other conduit inflates or deflates the tire. Although this system prevents the air within the tires from escaping due to leaks in the sealing boxes, the use of double conduits, double sealing boxes and double controls make the system complicated and expensive.

A more practical arrangement, which eliminates the disadvantages of the above systems, uses a single conduit for both opening and closing the tire valve and inflating or deflating the tire tube by leaving the tire tube check valve within the valve stem rendering the tire pressure independent of leaks anywhere in the system. This system employs a differential piston or diaphragm placed on the tire stem in operative engagement with the tube check valve. The sides of the differential piston are in fluid connection such that air pressure applied to one side of the piston will also be applied to the other side of the piston, however, the difference in piston area will cause the piston to move, thereby opening the check valve. The tire may be inflated by using a higher air pressure within the feeding line than is present in the tire tube, and to deflate the tire it is necessary to charge the feeding line with a pressure less than the tire pressure. If all pressure is withdrawn from the feeding line, the spring in the check valve will seal the air within the tire. The primary disadvantages of this system are due to the check valve in the tire stem limiting the air flow, especially during deflation when there is little pressure difference between the piston and the tire tube, causing deflation to be too slow for many purposes. Also, the low pressure characteristics of this type of system are largely dependent on the strength of the check valve spring of each tire tube thereby producing uneven minimum tire pressures if the springs of the tires are not matched, as the check valve spring will close the check valve when the pressure exerted by the differential piston is less than that exerted by the spring.

An object of the present invention is to provide a valve for a pneumatic tire in which a differential pressure responsive element is moved by a pressurized gas to open a check valve to permit the inflation or deflation of a pneumatic tire.

A further object of the invention is to design a tire operating valve wherein the opening mechanism and check valve comprise a single unit.

Another object of the invention is to produce a combined opening and closing check valve which is economical to manufacture and may be mounted on any tire stem without modification to the stem.

Yet another object of the invention is to produce a combined opening and closing check valve structure wherein the spring and area of the valve are of such values as to constitute safety features to prevent the tires from being deflated beyond safe operating conditions.

These and other objects of the invention will become apparent from the following specification and drawings.

FIG. 1 is a cross-section elevation of a combination valve utilized by a tire control system.

FIG. 2 is a cross-section elevation of a modification of combination valve.

The invention may be used with any type of pneumatic tired vehicle, and in the illustrated embodiment a form of opening and closing check combination valve is shown at 10, which consists of a housing comprised of an upper portion 12 formed to a lower portion 14. Portion 12 is provided with an extending nipple 16 onto which a feed or pressure line may be connected, the valve 10 may be threaded to the top of a tire tube valve stem 15 by means of threaded orifice 18. Before the valve 10 is attached to the valve stem, the valve stem check valve must be removed whereupon the orifice 18 is screwed upon the valve stem until the stem engages sealing ring 20 to form an airtight connection.

A differential pressure responsive element or piston 22 is supported within valve 10 and consists of a large diaphragm 24 and a small diaphragm 26 which are centrally held together by a tubular rivet type fastener 28 acting on washers 30 and 32. A spacer 34 maintains the diaphragms 24 and 26 in spaced relation while the bore 36 will permit equal air pressure on both sides of piston 22. The periphery of the diaphragms 24 and 26 are spaced by a sheet metal spacer 38 and held in place by housing portions 12 and 14, which are assembled by folding under lip 40. A vent 42 opens into the space 44 to prevent inconsistent performance due to air leaking into space 44 and building up a pressure.

A valve seat support 46 is also held in place by the assembling of housing portions 12 and 14 and is formed with a valve seat 48, which is part of the check valve structure. As shown by FIG. 1, the valve seat support 46 and the diaphragms 24, 26 connected by fastener 28 divide the interior of the housing into three communicating chambers. A guide bracket 50 is mounted within housing portion 14 and serves to guide stem 52 which carries spring 54 biasing check valve 56 in engagement with valve seat 48. A contact 58 extends from the upper end of stem 52 for engagement with piston 22 and is formed with air passages therein. The area of the air passages in fastener 28, contact 58, support 46, bracket 50 and ring 20 are all greater than the area of the air passage of the tire tube valve stem 15, therefore, the rate of flow of air is limited by the tube stem rather than the combination valve 10.

The operation of combination valve 10 is as follows:

After the valve stem check valve has been removed, valve 10 is threaded onto the valve stem 15, and a source of compressed air is attached to nipple 16. To inflate the tire an air pressure greater than that of the pressure within the tire is introduced into valve 10. The air will flow to both sides of piston 22, and, since the area of diaphragm 24 is greater than that of diaphragm 26, the piston 22 will move downwardly toward contact 58. As contact 58 is displaced, the check valve 56 will be opened permitting the air to flow into the tire. When the desired tire pressure is obtained, the pressure of the air being introduced into valve 10 from the compressed air source is reduced to atmospheric pressure by exhaust to the atmosphere as hereinafter described so as to return the pressure within valve 10 to atmospheric, thereupon the spring 54 will close check valve 56 and the pressure within the tire acting upon the area 60 of check valve 56 will keep check valve 56 seated.

When it is desired to deflate the tire, air is introduced into valve 10 through nipple 16 at a pressure less than that of the tire but greater than atmospheric pressure whereby the large pressure area of diaphragm 24 will cause check valve 56 to be opened, since the pressure within valve 10 is less than that of the tire, the air will flow to the lower pressure differential deflating the tire.

The spring 54 and area 60 are constructed such that when the air within the tire reaches the minimum safe operating pressure the check valve 56 will be closed and held shut even though there is pressurized air within valve 10. This is due to the pressure exerted by spring 54 and that of the air within the tire on area 60 being greater than the differential pressure exerted on piston 22 by the air from the compressed air source. This construction is especially important where one of the tires of the vehicle is leaking. Under these conditions the reduced pressure within the leaking tire reduces the force required to open the check valve 56 permitting air to be introduced into the leaking tire without disturbing the pressure of the remaining tires. This would permit the leaking tire to share part of the vehicle load and prevent overloading the other tires until repairs can be made. This feature provides an effective safety measure not possible when the check valve is within the valve stem.

A modification of the combination valve is shown in FIG. 2 wherein the operation is the same as in valve 10 of FIG. 1, however, a few structural design changes are present. Combination valve 10' comprises housing portions 12' and 14' which encompass a piston 22' which is composed of diaphragms 24' and 26' which are formed of a single piece of material; contact 58' is carried by piston 22' and upon piston deflection is adapted to engage check valve 56'. Check valve 56' is biased and guided in the same manner as the check valve 56 of FIG. 1. Valve seal 62 contacts valve seat 48' which consists of an annular lip depending from support 46'. The construction of the check valve 56' and valve seat 48' of this modification minimize any tendency of the valve to stick and provide a very accurate and sensitive combination valve although this modification would be more expensive to manufacture than the valve of FIG. 1.

Valve 10 or 10' may be utilized in systems for inflating or deflating pneumatic tires on a vehicle while in operation such as those systems shown and described in our U.S. Patents 2,944,579 and 2,976,906. These systems are but examples of systems for inflating and deflating pneumatic tires and are not given by way of limitation. It is contemplated that valve 10 or 10' may be used with other types of inflating and deflating systems not enumerated above.

The integration of the check valve with the opening and closing piston structure achieves accurate and consistent performance at each tire as the area of the check valve and strength of the closing spring may be accurately maintained and will not vary with each tire. Also, the dimensions of the combination valve air passages are greater than the core of tire valve stem thereby permitting the maximum possible flow of air into or out of the tire.

It is understood that various modifications may be apparent to those skilled in the art without departing from the spirit and scope of the invention, and the invention is not to be limited to the illustration embodiments except as included in the appending claims.

I claim:

1. A combination opening and closing check valve assembly for inflating and deflating a pneumatic tire comprising a housing, means on said housing for attaching the latter to a tire stem, means on said housing for attaching a source of compressed tire inflating gas to said housing, a differential piston constructed of a large and small diaphragm supported within said housing, said large diaphragm facing said second mentioned means, an open passage formed in said piston whereby said gas may contact said diaphragms, and a spring biased check valve supported in said housing and engaging said small diaphragm whereby movement of said piston due to the difference in gas pressure on the diaphragms will open said check valve permitting communication with a tire.

2. A combination opening and closing check valve assembly for a pneumatic tire comprising, a housing, a threaded connection in said housing for attaching said housing to a tire stem, a differential piston supported within said housing composed of a large diaphragm and a small diaphragm, tubular fastening means maintaining said diaphragms in spaced relation, a nipple formed on said housing for connection with a compressed tire inflation gas source, said large diaphragm facing said nipple, a check valve and seat supported within said housing, a spring biasing said check valve closed against said seat, a contacter carried by said check valve for engagement with said piston whereby pressurized gas within said housing will actuate said piston and open said check valve.

3. A combination opening and closing check valve assembly used in inflating and deflating a pneumatic tire comprising, a housing, means on said housing for attaching the latter to a tire stem, means on said housing for introducing a compressed gas into said housing, a differential piston supported within said housing, one side of said piston being larger in area than the reverse side, said larger side facing said means for introducing a compressed gas into said housing, a gas passage extending from said larger side to the reverse side of said piston to allow compressed gas to contact both sides of said piston, a check valve supported within said housing, a spring biasing said check valve closed, contact means carried by said check valve contacting said reverse side of said piston whereby said piston will open said check valve upon the compressed gas reaching a predetermined pressure.

4. A valve for use in inflating and deflating a pneumatic tire including a hollow housing, a pressure responsive element and a wall in said housing dividing the interior of said housing into first, second and third chambers, said element being formed by spaced first and second diaphragms having openings formed therein, means extending through said openings connecting said diaphragms and providing a gas passage from the first chamber into the second chamber, said wall being formed with an opening therein providing a gas passage from said second chamber into said third chamber, a check valve in the third chamber, spring means secured in the third chamber contacting said check valve normally forcing said check valve into the opening in said wall to close the gas passage between the second and third chambers, said first diaphragm having a greater area than said second diaphragm, said housing being formed with an opening leading into the first chamber permitting the introduction of a compressed gas into said housing, means in said housing providing a gas passage between the third chamber and a pneumatic tire stem, said first diaphragm facing the opening in the housing which leads into the first chamber, said second diaphragm adapted to contact and move said check valve from the opening in the wall against the pressure of said spring to open the gas passage between the second and third chambers to allow the passage of gas from the third chamber into the second chamber.

5. A valve for use in deflating and inflating pneumatic tires including a housing having first and second openings at opposite ends providing gas passages, a valve seat support formed with an opening therein mounted in said housing between the openings in the housing, a pressure responsive element comprising first and second diaphragms mounted in said housing between said support and the first opening in said housing, a fastener securing the diaphragms together having a bore therein to provide a gas passage therebetween, said first diaphragm having a greater area than the second diaphragm and facing the first opening in said housing, a check valve removably seated in the opening in said support, spring means in said housing forcing said check valve into the opening in the valve seat support, means carried by said check valve to contact said second diaphragm whereby a pressurized gas entering said housing through the first opening in said housing will move the diaphragms toward the valve seat support and move the check valve from the opening in the support against the action of said spring.

References Cited in the file of this patent

UNITED STATES PATENTS

| | | |
|---|---|---|
| 1,736,274 | Morley | Nov. 19, 1929 |
| 1,805,397 | Harris | May 12, 1931 |
| 1,827,662 | Maas | Oct. 13, 1931 |

FOREIGN PATENTS

| | | |
|---|---|---|
| 311,200 | Great Britain | Apr. 30, 1929 |